(12) United States Patent
Skygebjerg (10) Patent No.: US 9,680,841 B2
(45) Date of Patent: Jun. 13, 2017

(54) NETWORK AUTHENTICATION METHOD FOR SECURE USER IDENTITY VERIFICATION USING USER POSITIONING INFORMATION

(71) Applicant: KEYPASCO AB, Gothenburg (SE)

(72) Inventor: Per Skygebjerg, Gothenburg (SE)

(73) Assignee: KEYPASCO AB, Gothenburg (SE)

( * ) Notice: Subject to any disclaimer, the term of this patent is extended or adjusted under 35 U.S.C. 154(b) by 10 days.

(21) Appl. No.: 14/187,855

(22) Filed: Feb. 24, 2014

(65) Prior Publication Data

US 2015/0242602 A1 Aug. 27, 2015

(51) Int. Cl.
*G06F 21/31* (2013.01)
*H04L 29/06* (2006.01)
*G06F 21/35* (2013.01)
*H04W 12/06* (2009.01)

(52) U.S. Cl.
CPC ............ *H04L 63/126* (2013.01); *G06F 21/35* (2013.01); *H04L 63/0876* (2013.01); *H04W 12/06* (2013.01); *G06F 2221/2111* (2013.01)

(58) Field of Classification Search
CPC .. G06F 21/31; G06F 21/35; G06F 2221/2111; H04L 63/126; H04L 63/0876; H04W 12/06
USPC .......... 726/2–7, 26–30; 705/67, 75; 713/168
See application file for complete search history.

(56) References Cited

U.S. PATENT DOCUMENTS

| | | | |
|---|---|---|---|
| 9,355,231 B2 * | 5/2016 | Disraeli | G06F 21/31 |
| 2003/0120940 A1 * | 6/2003 | Vataja | G06F 21/10 713/193 |
| 2004/0250074 A1 | 12/2004 | Kilian-Kehr | |
| 2008/0172340 A1 * | 7/2008 | Karlsson | G06Q 20/401 705/75 |
| 2008/0207220 A1 * | 8/2008 | Aaron | H04W 12/12 455/456.1 |

(Continued)

FOREIGN PATENT DOCUMENTS

| | | |
|---|---|---|
| CN | 201928293 U | 8/2011 |
| EP | 2 506 525 | 10/2012 |

(Continued)

OTHER PUBLICATIONS

Ugo Biader Ceipidor et al, KerNeeS a protocol for mutual authentication between NFC phones and POS terminals for secure payment transactions, pp. 115-120, IEEE, 2012.*

(Continued)

*Primary Examiner* — Shanto M Abedin
(74) *Attorney, Agent, or Firm* — Hamre, Schumann, Mueller & Larson, P.C.

(57) ABSTRACT

In a network authentication method, upon receipt of correct user login data from a user terminal, a content-provider server transmits a verification request to a verification server via a communication network. After receiving hardware identification data and positioning information, which are associated with the user terminal and a portable personal electronic device carried by a user, the verification server transmits a verification reply indicating successful authentication of the identity of the user when the hardware identification data is successfully verified while the positioning information indicates that the portable personal electronic device is in close proximity to the user terminal.

14 Claims, 11 Drawing Sheets

(56) References Cited

U.S. PATENT DOCUMENTS

| | | | |
|---|---|---|---|
| 2010/0235429 A1* | 9/2010 | Simonen | H04L 63/0492 709/203 |
| 2012/0023026 A1* | 1/2012 | Chen | G06Q 20/108 705/75 |
| 2012/0220216 A1* | 8/2012 | Carbonell Duque | H04B 5/0031 455/26.1 |
| 2013/0282589 A1* | 10/2013 | Shoup | G06Q 20/388 705/67 |

FOREIGN PATENT DOCUMENTS

| | | | |
|---|---|---|---|
| GB | 2492614 A | | 9/2013 |
| JP | 2007-065801 A | | 3/2007 |
| JP | 2009110098 A | | 5/2009 |
| KR | 1020100119325 A | | 11/2010 |
| TW | 201032084 A1 | | 9/2010 |

OTHER PUBLICATIONS

Search Report issued by EPO in European Counterpart Application No. 14157510.0 on Aug. 20, 2014.

Search Report appended in an Office Action issued by Taiwan Intellectual Property Office in Taiwanese Counterpart Application No. 101140766 on Jul. 17, 2014, and corresponding English translation.

* cited by examiner

NETWORK AUTHENTICATION METHOD FOR SECURE USER IDENTITY VERIFICATION USING USER POSITIONING INFORMATION

BACKGROUND OF THE INVENTION

1. Field of the Invention

The invention relates to network identity authentication, and more particularly to a network authentication method for secure verification of the identity of a user.

2. Description of the Related Art

Currently, various web transactions have become increasingly popular. In order to secure these web transactions, user identity authentication is absolutely necessary. However, due to the increasing numbers of web users and web crimes, and the continuous progress of criminal techniques, for example, an Internet content provider (ICP) needs to provide an identity verification device for each user. Thus, the cost of customer service for personalization, distribution and troubleshooting is considerable. Further, it is quite inconvenient that the user needs to have different identity verification devices for different ICPs. Moreover, aside from intercepting and stealing user IDs and passwords, hackers also try to manipulate transaction data. Therefore, the ICP is often forced to change hardware equipments, thereby generating additional cost.

SUMMARY OF THE INVENTION

Therefore, an object of the present invention is to provide a network authentication method for secure verification of the identity of a user that can overcome the aforesaid drawbacks of the prior art.

According to one aspect of the present invention, there is provided a network authentication method to be implemented by a network authentication system for secure verification of the identity of a user. The network authentication system includes a user terminal operated by the user, a content-provider server, a verification server, and a portable personal electronic device carried by the user. The user terminal, the content-provider server and the verification server are connected to a communication network. The portable personal electronic device is capable of connection with the communication network and/or short-distance wireless communication with the user terminal. The network authentication method of the present invention comprises the steps of:

a) upon receipt of correct user login data, which includes a user identifier, from the user terminal via the communication network, the content-provider server transmitting a verification request, which includes the user identifier, to the verification server via the communication network;

b) after receipt of the verification request from the content-provider server, the verification server further receiving hardware identification data and positioning information that are associated with the user terminal and the portable personal electronic device via the communication network;

c) in response to the verification request, the verification server determining whether the hardware identification data obtained in step b) matches or is a subset of reference hardware identification data, which is pre-stored in the verification server and which corresponds to the user identifier, and judging, based on the positioning information, whether the user terminal and the portable personal electronic device are in close proximity to each other; and d) upon determining that a match exists or that the hardware identification data is a subset of the reference hardware identification data and judging that the user terminal and the portable personal electronic device are in close proximity to each other, the verification server transmitting a verification reply indicating successful authentication of the identity of the user to the content-provider server via the communication network.

According to another aspect of the present invention, there is provided a network authentication method to be implemented by a network authentication system for secure verification of the identity of a user. The network authentication system includes a user terminal operated by the user, a content-provider server, a verification server, and a portable personal communication device carried by the user. The user terminal, the content-provider server, the verification server and the portable personal communication device are connected to a communication network. The network authentication method of the present invention comprises the steps of:

a) upon receipt of correct user login data including a user identifier, and of first positioning data corresponding to a geographical location of the user terminal from the user terminal via the communication network, the content-provider server transmitting to the verification server a first request, which includes the user identifier, for second positioning data corresponding to a current geographical location of the portable personal communication device via the communication network;

b) after receipt of the first request from the content-provider server, the verification server further receiving hardware identification data and second positioning data that are associated with the portable personal communication device from the portable personal communication device via the communication network;

c) the verification server determining whether the hardware identification data obtained in step b) matches or is a subset of reference hardware identification data, which is pre-stored in the verification server and which corresponds to the user identifier, and transmitting the second positioning data to the content-provider server if a match exists or if the hardware identification data is a subset of the reference hardware identification data; and d) upon receipt of the second positioning data from the verification server, the content-provider server judging, based on the first positioning data received thereby in step a) and the second positioning data transmitted thereto in step c), whether the user terminal and the portable personal communication device are in close proximity to each other, and judging a successful authentication of the identity of the user upon judging that the user terminal and the portable personal communication device are in close proximity to each other.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
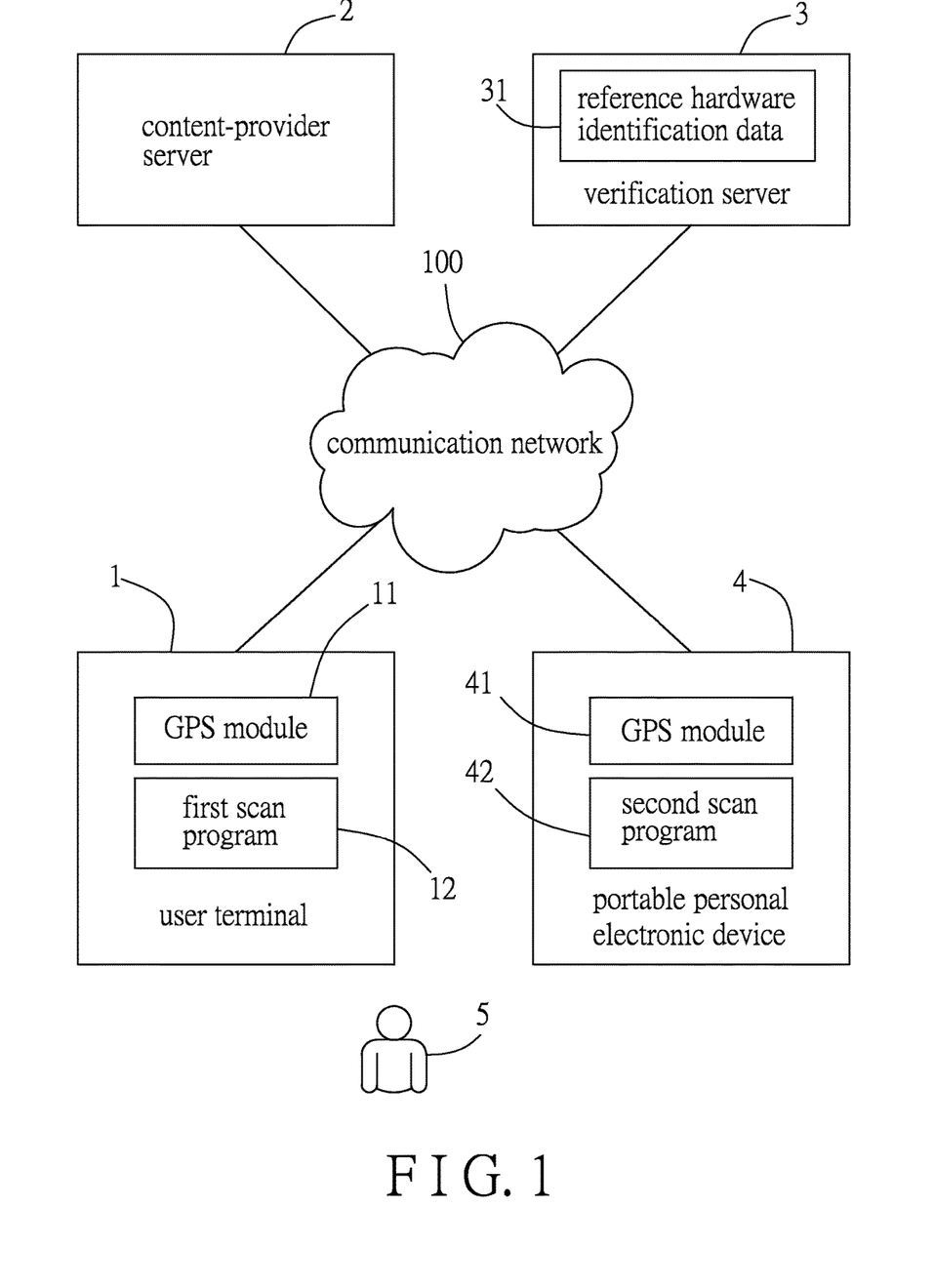
FIG. 1 is a schematic block diagram illustrating a network authentication system that is configured for implementing the first preferred embodiment of a network authentication method according to the present invention.

Referring to FIG. 1, a network authentication system is used to implement the first preferred embodiment of a network authentication method for secure identification of the identity of a user 5 according to the present invention. The network authentication system includes a user terminal 1, such as a personal computer or a notebook computer, operated by the user 5, a content-provider server 2, such as the server of an Internet content provider (ICP), a verification server 3, and a portable personal electronic device 4 carried by the user 5. The user terminal 1, the content-provider server 2 and the verification server 3 are connected to a communication network 100, such as the Internet. The portable personal electronic device 4 is capable of connection with the communication network 100 and/or short-distance connection with the user terminal 1 (see, for instance, FIG. 6). In this embodiment, if the identity of the user 5 is successfully authenticated by the network authentication system, the user 5 is allowed data access to the content-provider server 2 using the user terminal 1.

Figure 2:
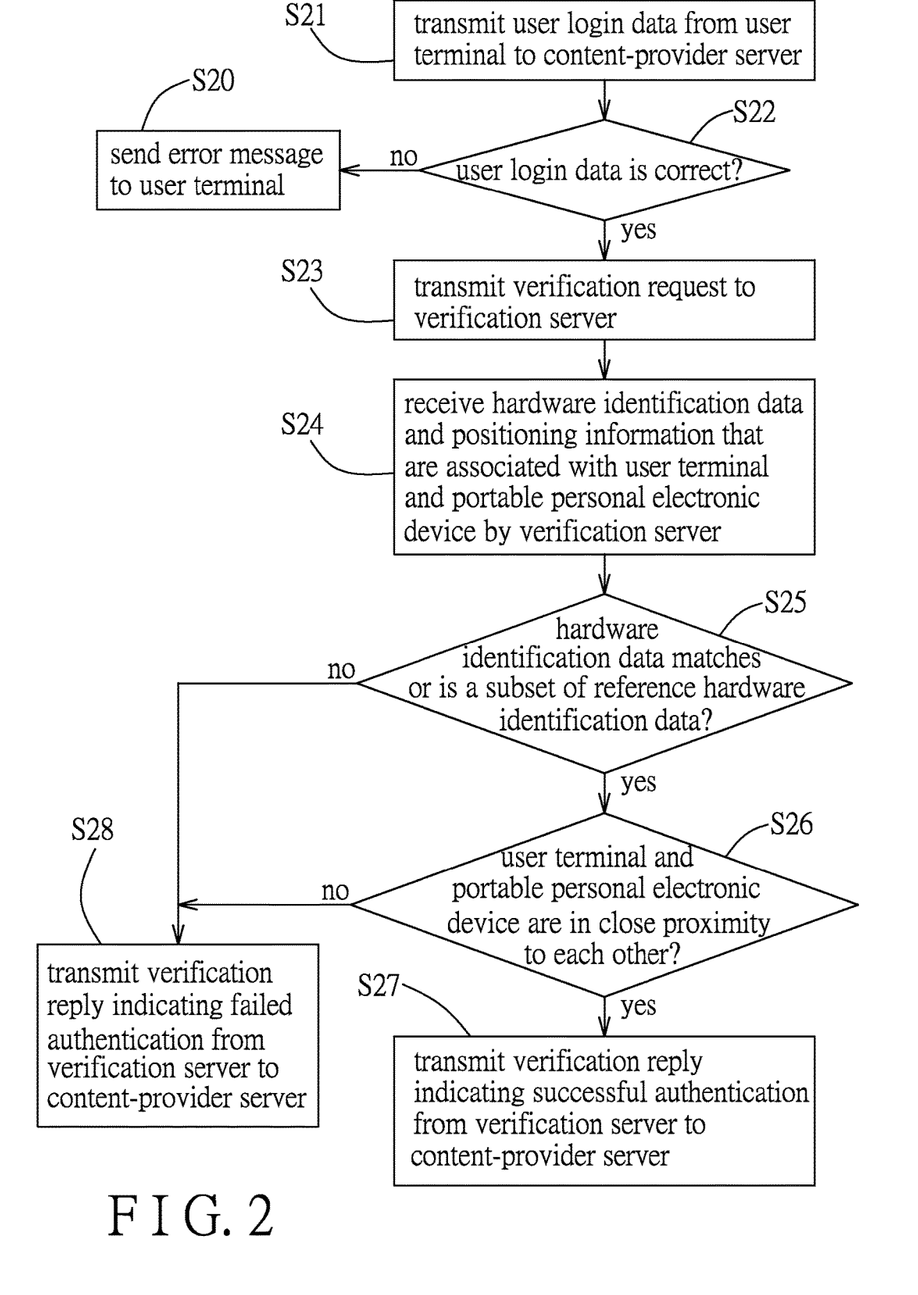
FIG. 2 is a flow chart illustrating the first preferred embodiment.

FIG. 2 is a flow chart of the first preferred embodiment of the network authentication method illustrating how the identity of the user 5 is verified. The first preferred embodiment of the network authentication method includes the following steps.

In step S21, the user 5 inputs user login data using a user input interface (not shown) of the user terminal 1 at a website provided by the content-provider server 2. The user login data is then transmitted from the user terminal 1 to the content-provider server 2 via the communication network 100. In this embodiment, the user login data includes a user identification (ID) serving as a user identifier, and a password.

In step S22, upon receipt of the user login data from the user terminal 1, the content-provider server 2 checks whether the user login data is correct. If the result is affirmative, the flow proceeds to step S23. Otherwise, the content-provider server 2 sends an error message to the user terminal 1 for displaying on a display device (not shown) of the user terminal 1 (step S20).

In step S23, the content-provider server 2 transmits a verification request, which includes the user identifier, to the verification server 3 via the communication network 100. In this embodiment, the verification server 3 may be regarded as a third party appointed by the content-provider server 2 to perform identity authentication.

Figure 3:
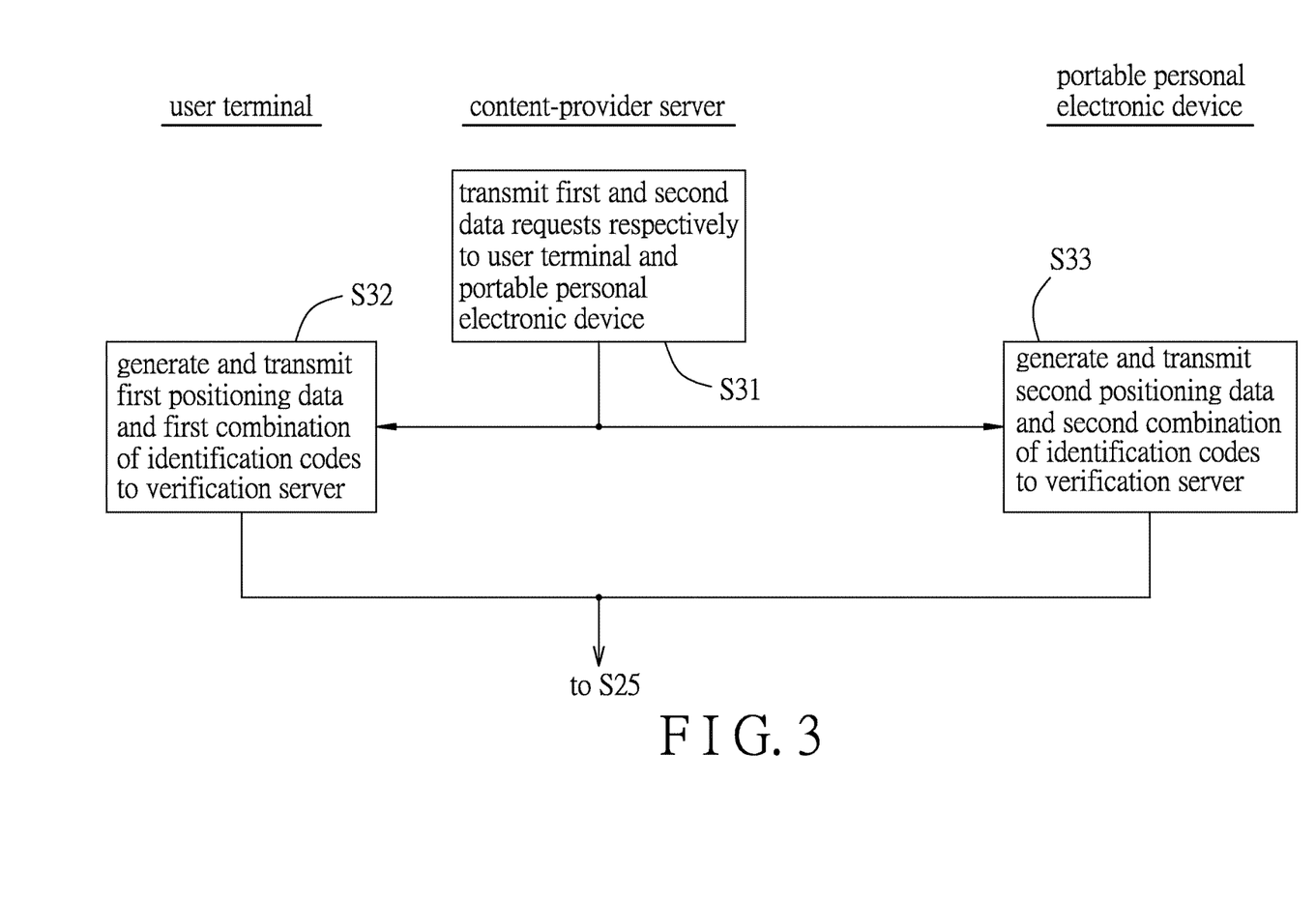
FIG. 3 is a flow chart of a first procedure between steps S23 and S24 of the first preferred embodiment.

In step S24, after receipt of the verification request from the content-provider server 2, the verification server 3 further receives hardware identification data and positioning information that are associated with the user terminal 1 and the portable personal electronic device 4. For example, as shown in FIG. 1, the user terminal 1 includes a global positioning system (GPS) module 11, and pre-stores a first scan program 12. The portable personal electronic device 4 may be, but is not limited to, a smart phone or a tablet computer, includes a GPS module 41, and pre-stores a second scan program 42. In this example, two different network addresses, e.g., IP addresses, are assigned respectively to the user terminal 1 and the portable personal electronic device 4. FIG. 3 shows a first procedure to be performed between steps S23 and S24, illustrating how the hardware identification data and the positioning information are provided to the verification server 3. The first procedure includes the following steps. In step S31, after transmitting the verification request to the verification server 3, the content-provider server 2 further transmits first and second data requests respectively to the user terminal 1 and the portable personal electronic device 4 via the communication network 100. In step S32, in response to the first data request from the content-provider server 2, the user terminal 1 performs GPS positioning using the GPS module 11 so as to obtain first positioning data that corresponds to a geographical location of the user terminal 1, executes the first scan program 12 to obtain a first combination of identification codes of certain ones of a plurality of hardware components of the user terminal 1, and transmits the first positioning data and the first combination of the identification codes to the verification server 3 via the communication network 100. It is noted that since generation of the first combination of the identification codes using execution of the first scan program 12 is known to those skilled in the art, details of the same are omitted herein for the sake of brevity. In step S33, in response to the second data request from the content-provider server 2, the portable personal electronic device 4 performs GPS positioning using the GPS module 41 so as to obtain second positioning data that corresponds to a current geographical location of the portable personal electronic device 4, executes the second scan program 42 to obtain a second combination of identification codes of certain ones of a plurality of hardware components of the portable personal electronic device 4, and transmits the second positioning data and the second combination of the identification codes to the verification server 3 via the communication network 100. Thus, the first combination of the identification codes from the user terminal 1 and the second combination of the identification codes from the portable personal electronic device 4 cooperatively constitute the hardware identification data received by the verification server 3 in step S24. The first positioning data from the user terminal 1 and the second positioning data from the portable personal electronic device 4 cooperatively constitute the positioning information received by the verification server 3 in step S24.

Figure 4:
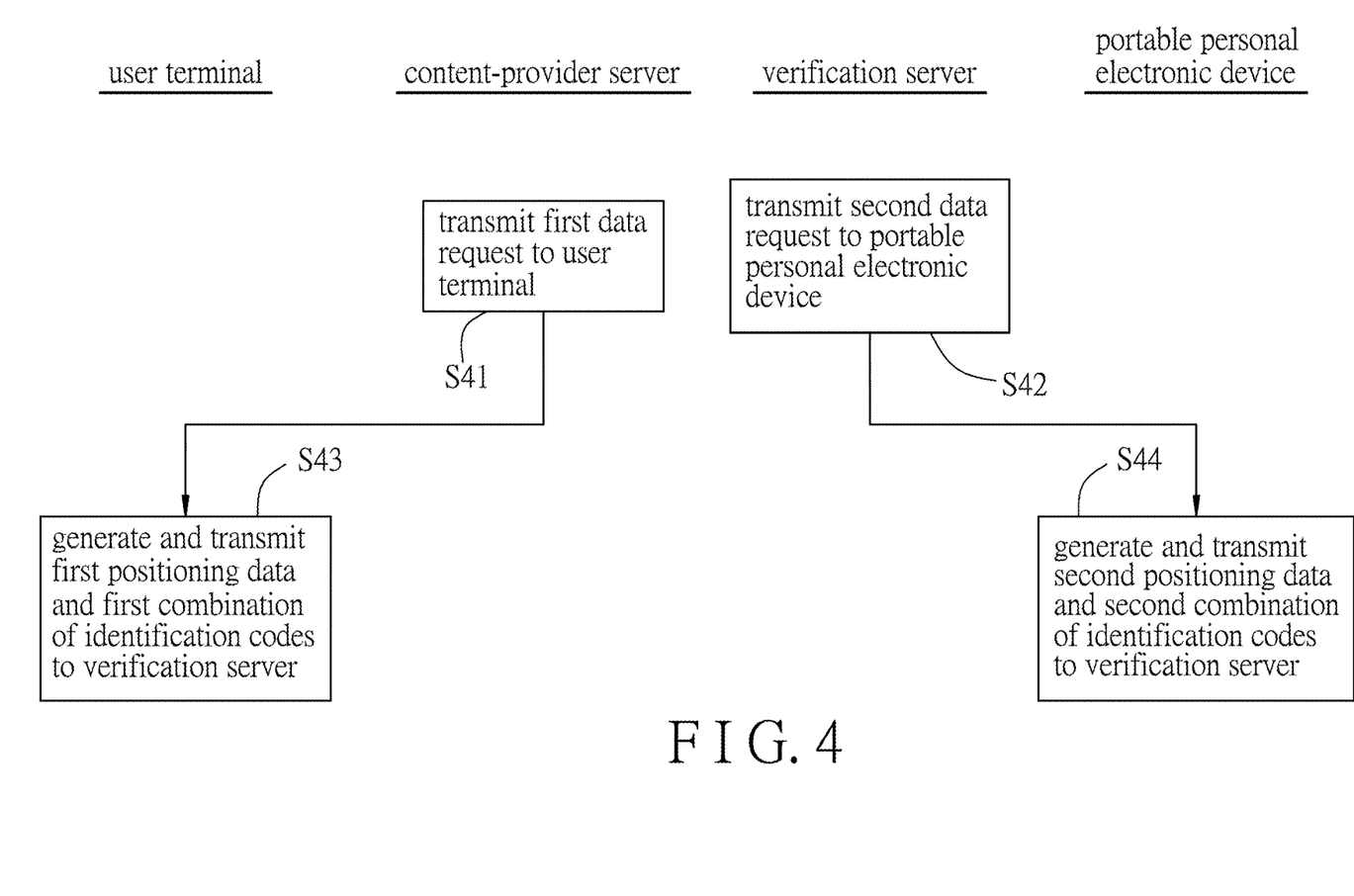
FIG. 4 is a flow chart of a second procedure between steps S23 and S24 of the first preferred embodiment.

FIG. 4 shows a second procedure to be conducted between step S23 and step S24, illustrating how the hardware identification data and the positioning information are provided to the verification server 3. The second procedure includes the following steps. In step S41, the content-provider server 2 transmits a first data request to the user terminal 1 via the communication network 100. In step S42, in response to receipt of the verification request from the content-provider server 2, the verification server 3 transmits a second data request to the portable personal electronic device 4 via the communication network 100. In step S43, similar to step S32 of FIG. 3, the first combination of the identification codes, and the first positioning data both generated by the user terminal 1 are transmitted from the user terminal 1 to the verification server 3 via the communication network 100. In step S44, similar to step S33 of FIG. 3, the second combination of the identification codes, and the second positioning data both generated by the portable personal electronic device 4 are transmitted from the portable personal electronic device 4 to the verification server 3 via the communication network 100.

Figure 5:
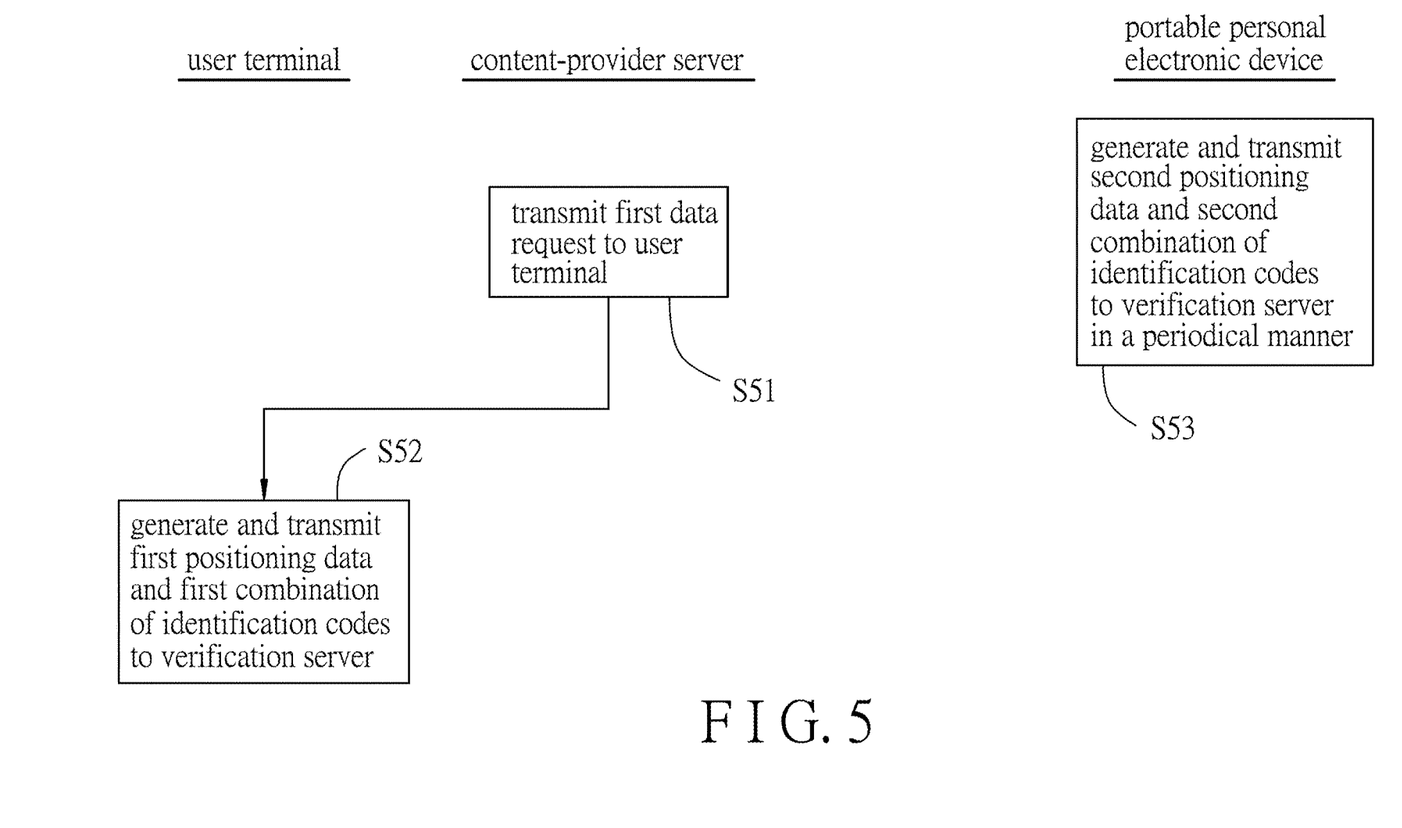
FIG. 5 is a flow chart of a third procedure between steps S23 and S24 of the first preferred embodiment.

FIG. 5 shows a third procedure to be performed between step S23 and step S24, illustrating how the hardware identification data and the positioning information are provided to the verification server 3. The third procedure includes the following steps. In step S51, similar to step S41 of FIG. 4, the first data request is transmitted from the content-provider server 2 to the user terminal 1. In step S52, similar to step S43 of FIG. 4, the first combination of the identification codes, and the first positioning data both generated by the user terminal 1 are transmitted from the user terminal 1 to the verification server 3 via the communication network 100. However, unlike the first and second procedures, the portable personal electronic device 4 is operable to perform GPS positioning so as to obtain the second positioning data in a periodic manner, to automatically execute the second scan program 42 to obtain the second combination of the identification codes, and to transmit the second positioning data and the second combination of the identification codes to the verification server 3 in a periodic manner. Therefore, step S53 of the third procedure essentially involves the periodic generation and transmission of the second positioning data and the second combination of the identification codes to the verification server 3 by the portable personal electronic device 4. In this case, the first combination of the identification codes from the user terminal 1, and the second combination of the identification codes, which is most recently received by the verification server 3 in step S24 after the verification server 3 has received the verification request, cooperatively constitute the hardware identification data. The first positioning data from the user terminal 1, and the second positioning data, which is most recently received by the verification server 3 in step S24, cooperatively constitute the positioning information.

Figure 6:
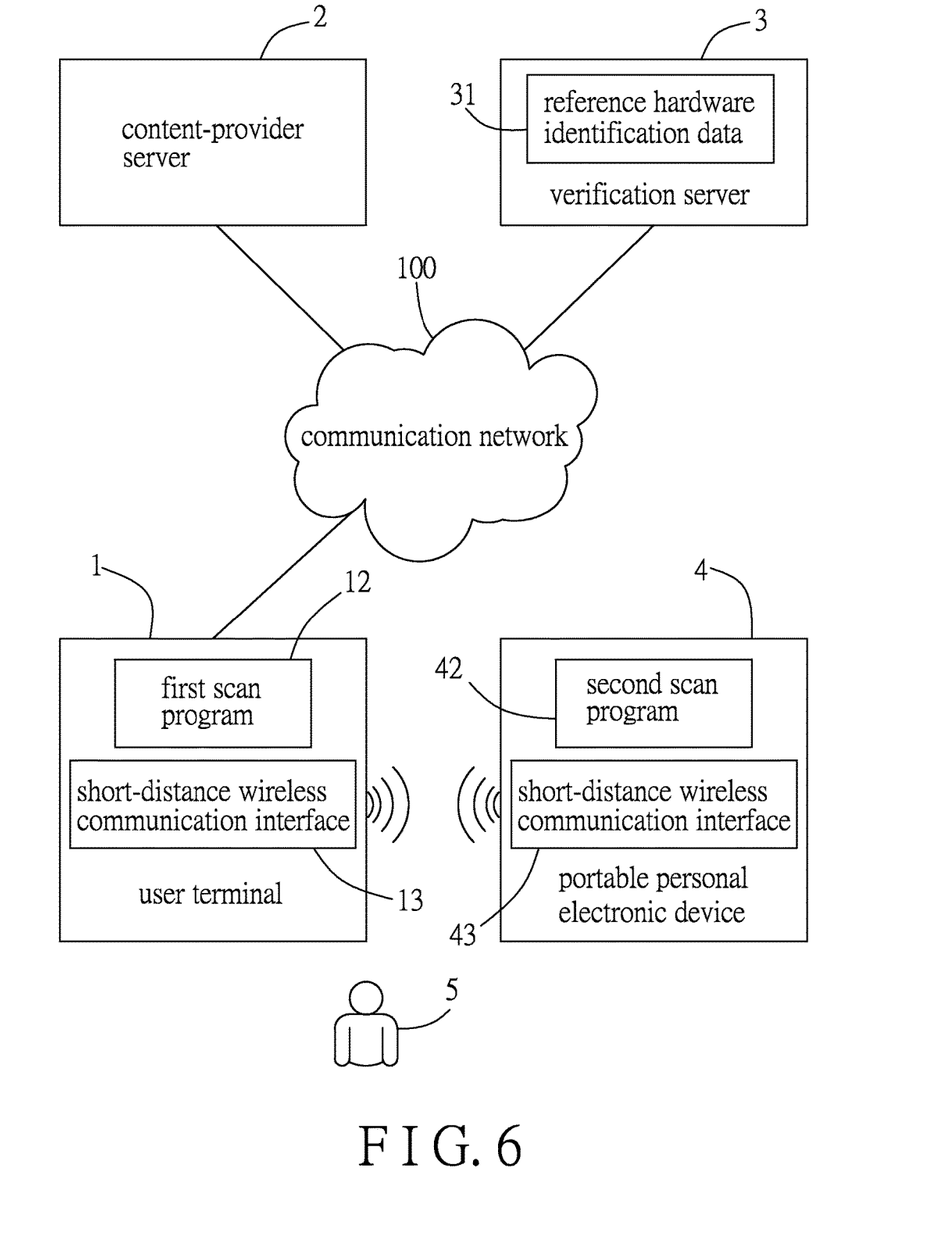
FIG. 6 is a schematic block diagram illustrating a first variation of the network authentication system.
Figure 7:
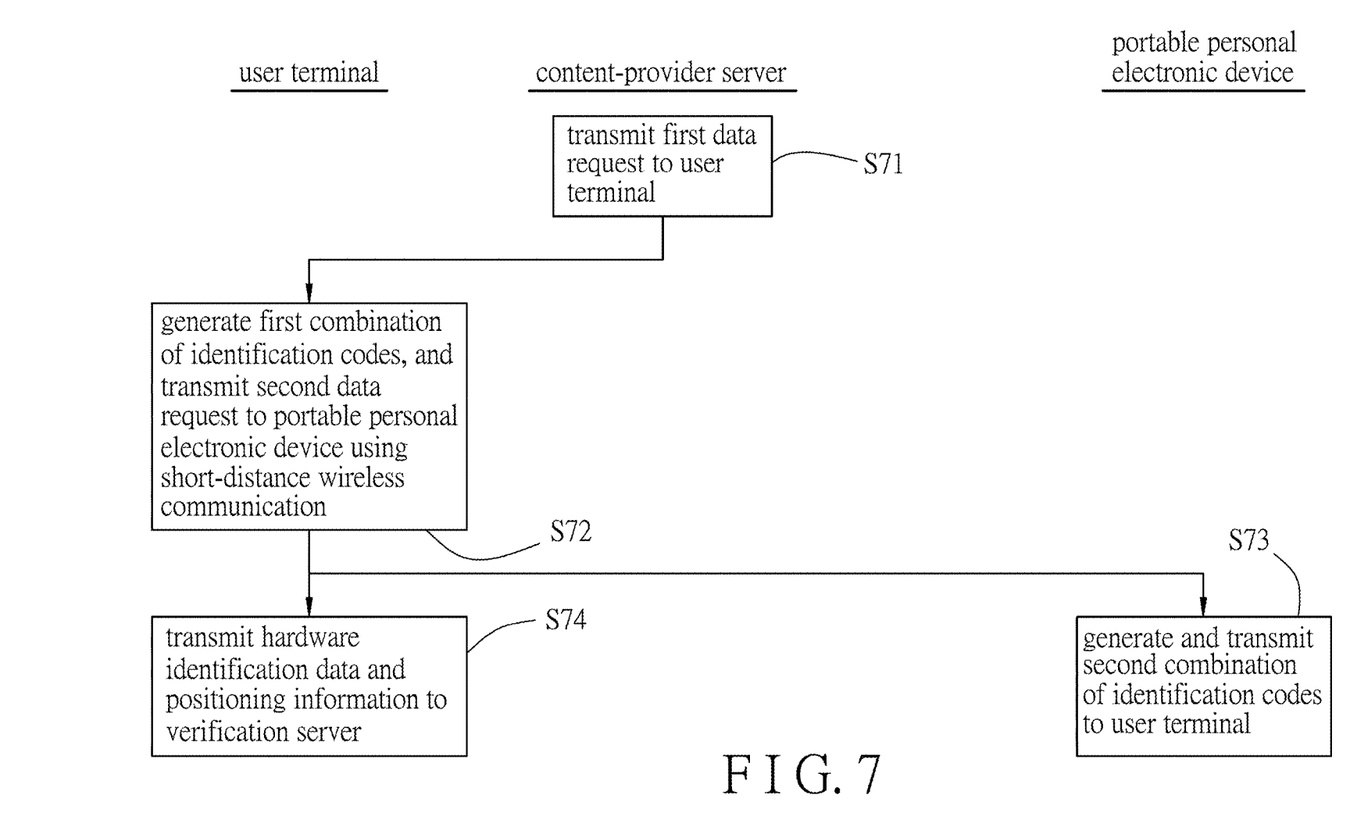
FIG. 7 is a flow chart of a fourth procedure between steps S23 and S24 of the first preferred embodiment to be implemented by the first variation of the network authentication system of FIG. 6.

Referring to FIG. 6, a first variation of the network authentication system is shown. Unlike the network authentication system of FIG. 1, the user terminal 1 includes a short-distance wireless communication interface 13, and pre-stores the first scan program 12. The portable personal electronic device 4 is unable to connect with the communication network 100, includes a short-distance wireless communication interface 43, and pre-stores the second scan program 42. The short-distance wireless communication interfaces 13, 43 may use near field communication (NFC), Bluetooth or wireless fidelity (Wi-Fi) technology. FIG. 7 shows a fourth procedure to be performed between step S23 and step S24 by the network authentication system of FIG. 6, illustrating how the hardware identification data and the positioning information are provided to the verification server 3. The fourth procedure includes the following steps. In step S71, similar to step S41 of FIG. 4, the first data request is transmitted from the content-provider server 2 to the user terminal 1. In step S72, in response to the first data request from the content-provider server 2, the user terminal 1 executes the first scan program 12 to obtain the first combination of the identification codes. When the portable personal electronic device 4 is in close proximity to the user terminal 1 to establish a short-distance wireless communication link therewith using the short-distance wireless communication interfaces 13, 43, the user terminal 1 transmits the second data request to the portable personal electronic device 4 through the short-distance wireless communication link. In step S73, in response to the second data request from the user terminal 1, the portable personal electronic device 4 executes the second scan program 42 to obtain the second combination of the identification codes and transmits the second combination of the identification codes to the user terminal 1 through the short-distance wireless communication link. In this case, the second combination of the identification codes serves as identification data associated with the portable personal electronic device 4. In step S74, the user terminal 1 transmits, to the verification server 3 via the communication network 100, the hardware identification data, which consists of the first combination of the identification codes and the second combination of the identification codes, i.e., the identification data, as well as the positioning information, which indicates that the user terminal 1 and the portable personal electronic device 4 share the same network address, i.e., the network address assigned to the user terminal 1. Thus, the hardware identification data and the positioning information are obtained by the verification server 3.

Figure 8:
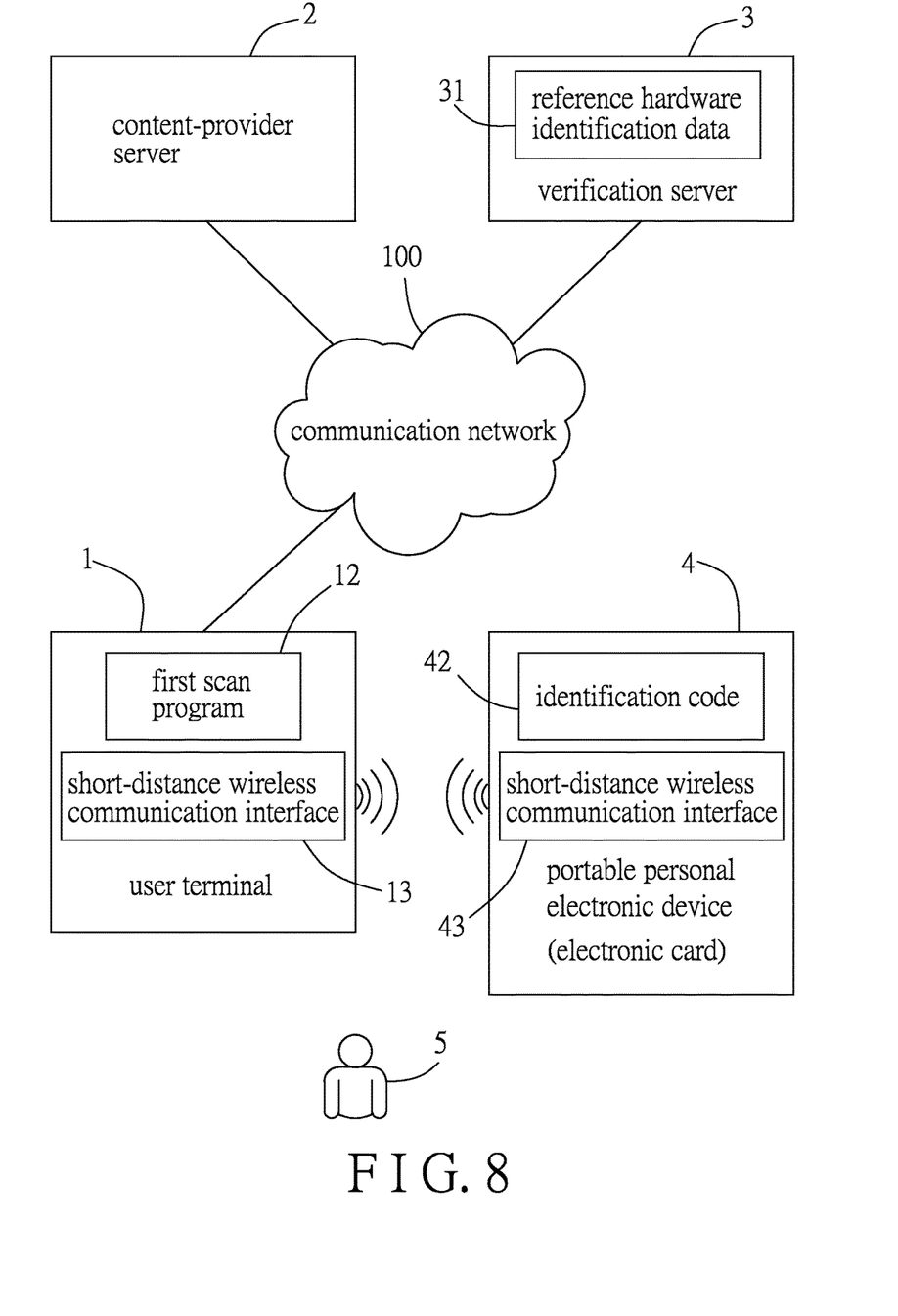
FIG. 8 is a schematic block diagram illustrating a second variation of the network authentication system.
Figure 9:
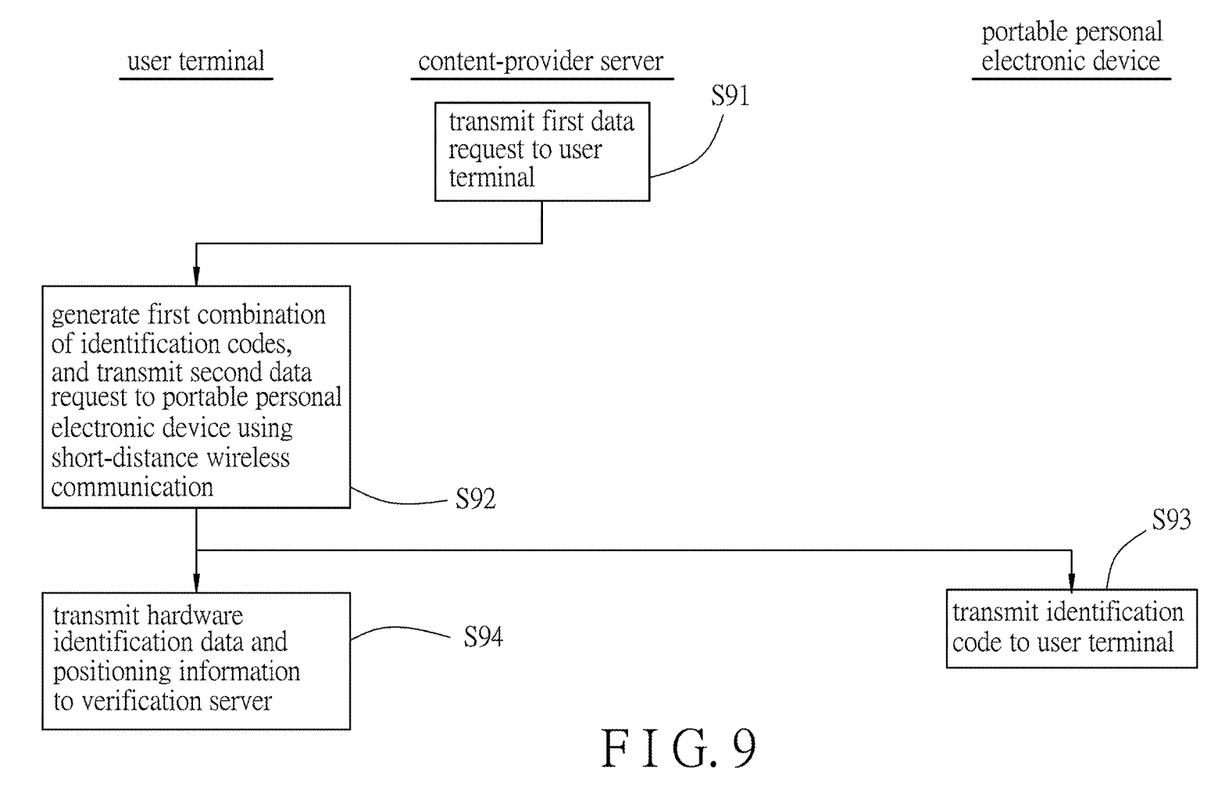
FIG. 9 is a flow chart of a fifth procedure between steps S23 and S24 of the first preferred embodiment to be implemented by the second variation of the network authentication system of FIG. 8.

Referring to FIG. 8, a second variation of the network authentication system is shown. Unlike the network authentication system of FIG. 6, the portable personal electronic device 4 may be an electronic card, and pre-stores an identification code, which uniquely corresponds to the portable personal electronic device 4 (the electronic card). In addition, the short-distance wireless communication interfaces 13, 43 may use radio frequency identification (RFID) technology. FIG. 9 shows a fifth procedure to be performed between step S23 and step S24 by the network authentication system of FIG. 8, illustrating how the hardware identification data and the positioning information are provided to the verification server 3. The fifth procedure includes the following steps. In step S91, similar to step S71 of FIG. 7, the first data request is transmitted from the content-provider server 2 to the user terminal 1. In step S92, similar to step S72 of FIG. 7, the first combination of the identification codes is generated by the user terminal 1, and the second data request is transmitted from the user terminal 1 to the portable personal electronic device 4 using short-distance wireless communication. In step S93, in response to the second data request from the user terminal 1, the portable personal electronic device 4 transmits the identification code, which serves as the identification data, to the user terminal 1 using short-distance wireless communication. In step S94, the user terminal 1 transmits the hardware identification data, which consists of the first combination of the identification codes and the identification code, i.e., the identification data, and the positioning information, which indicates that the user terminal 1 and the portable personal electronic device 4 are in close proximity to each other, via the communication network 100. Thus, the hardware identification data and the positioning information are obtained by the verification server 3.

Referring back to FIGS. 1 and 2, after step S24, the method proceeds to step S25, where in response to the verification request, the verification server 3 determines whether the hardware identification data obtained thereby matches reference hardware identification data 31, which is pre-stored therein and which corresponds to the user identifier, i.e., the user ID. If the hardware identification data is determined to be a subset of the reference hardware identification data 31, the flow proceeds to step S26. Otherwise, the flow goes to step S28.

It should be noted that, during a registration procedure prior to authentication, the user terminal 1 and the portable personal electronic device 4 provided by the same owner are registered in the content-provider server 2, and are loaded respectively with the first scan program 12, and the second scan program 42 (FIGS. 1 and 6) or the identification code (FIG. 8). Thereafter, the first and second scan programs 12, 42 are executed respectively by the user terminal 1 and the portable personal electronic device 4 to obtain the identification codes of the hardware components of the user terminal 1, and the identification codes of the hardware components of the portable personal electronic device 4 that cooperatively constitute the reference hardware identification data 31 corresponding to the user identifier of the owner. In an alternative, the first and second scan programs 12, 42 may obtain the identification codes of the certain ones of the hardware components of the user terminal 1, and the identification codes of the certain ones of the hardware components of the portable personal electronic device 4 to cooperatively constitute the reference hardware identification data 31. Alternatively, the identification codes obtained using execution of the first scan program 12 and associated with the user terminal 1, the identification code loaded in the portable personal electronic device 4 cooperatively constitute the reference hardware identification data 31 corresponding to the user identifier of the owner. Then, the reference hardware identification data 31 is stored in the verification server 3 for authentication purposes. Therefore, if the hardware identification data is determined to be a subset of the reference hardware identification data 31 (or a complete match in the alternative case) in step S25, the user terminal 1 operated by the user 5 and the portable personal electronic device 4 carried by the user 5 belong to the same owner.

In step S26, the verification server 3 determines, based on the positioning information, whether the user terminal 1 and the portable personal electronic device 4 are in close proximity to each other. For example, when the first positioning data generated in sub-steps S32, S43 and S52 of FIGS. 3, 4 and 5 is identical to the second positioning data generated in sub-steps S33, S44 and S53 of FIGS. 3, 4 and 5, when the positioning information transmitted in sub-step S74 of FIG. 7 indicates that the user terminal 1 and the portable personal electronic device 4 share the same network address or when the positioning information transmitted in sub-step S94 of FIG. 9 indicates that the user terminal 1 and the portable personal electronic device 4 are in close proximity to each other, the verification server 4 determines that the user terminal 1 and the portable personal electronic device 4 are in close proximity to each other, and the flow then proceeds to step S27. Otherwise, the flow goes to step S28.

It should be noted that, when the user terminal 1 and the portable personal electronic device 4 are in close proximity to each other (step S26) while an affirmative determination is made in step S25, the user 5 is verified as the owner of the user terminal 1 and the portable personal electronic device 4.

In step S27, the verification server 3 transmits a verification reply indicating successful authentication of the identity of the user 5 to the content-provider server 2 via the communication network 100. Thus, the user 5 is allowed data access to the content-provider server 2.

In step S28, the verification server 3 transmits a verification reply indicating failed authentication of the identity of the user 5 to the content-provider server 2 via the communication network. Thus, the user 5 is denied data access to the content-provider server 2.

Figure 10:
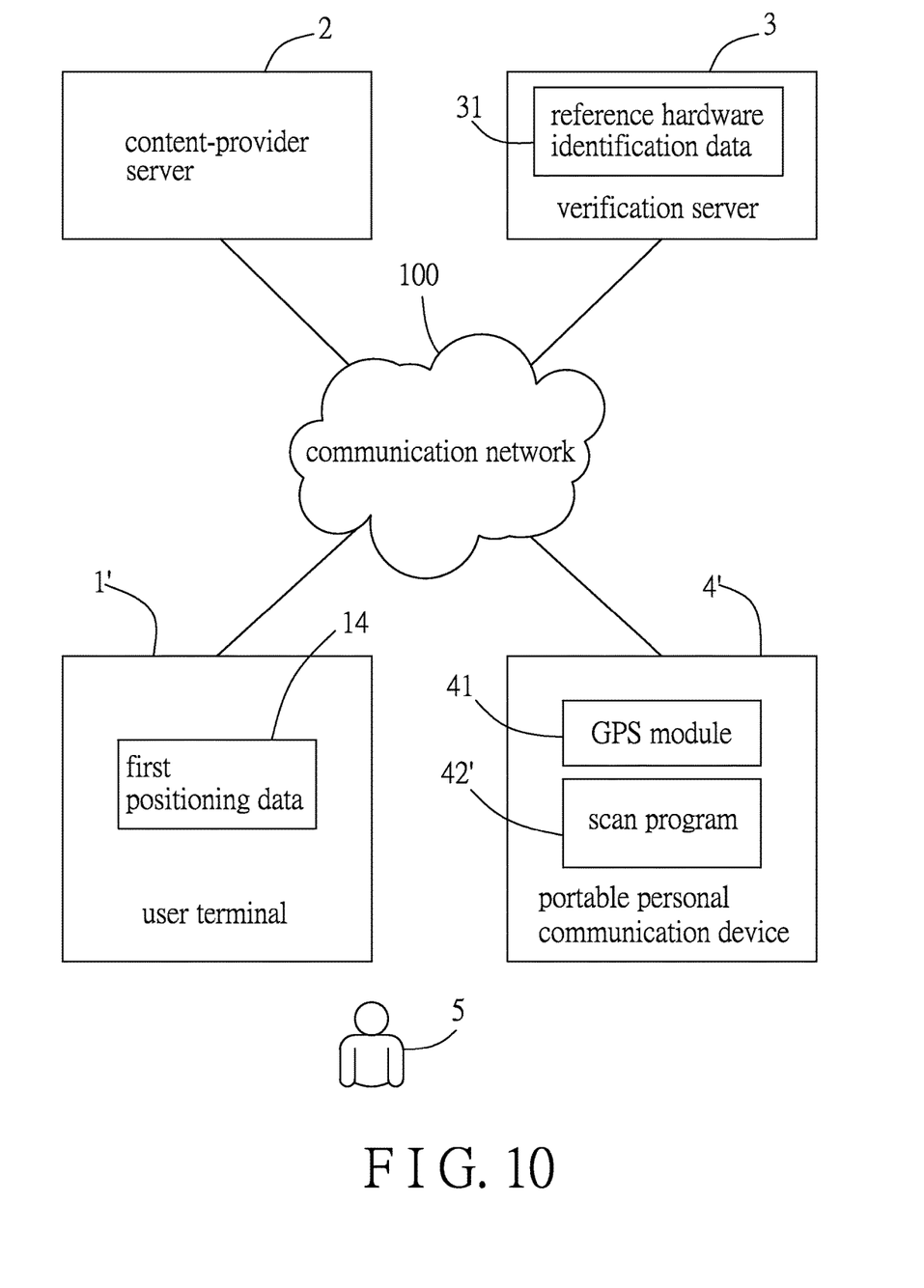
FIG. 10 is a schematic block diagram illustrating another network authentication system that is configured for implementing the second preferred embodiment of a network authentication method according to the present invention.

Referring to FIG. 10, another network authentication system, which is a modification of the network authentication system of FIG. 1, is used to implement the second preferred embodiment of a network authentication method for secure identification of the identity of a user 5 according to the present invention. Unlike the network authentication system of FIG. 1, the user terminal 1' of the network authentication system of FIG. 10 may be, but is not limited to, a point of sale (POS) terminal or an automated teller machine (ATM), and pre-stores first positioning data 14 corresponding to a geographical location of the user terminal 1'. In addition, the portable personal electronic device 4' is a portable personal communication device 4', which may be, but is not limited to, a smart phone or a tablet computer. The portable personal communication device 4' includes a GPS module 41, and pre-stores a scan program 42'. In this embodiment, if the identity of the user 5 is successfully authenticated by the network authentication system of FIG. 10, the user 5 is allowed data access to the content-provider server 2.

Figure 11:
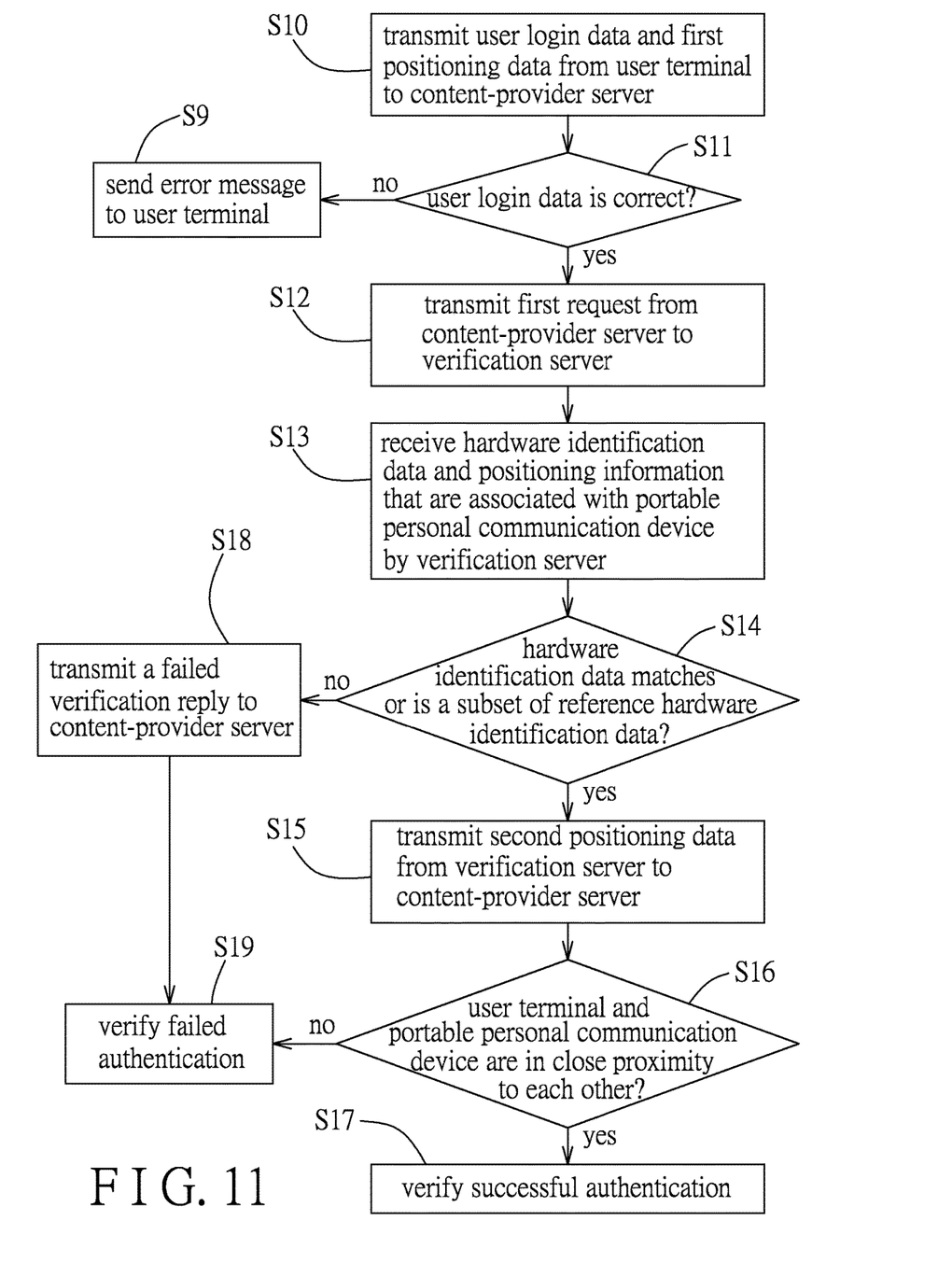
FIG. 11 is a flow chart illustrating the second preferred embodiment.

FIG. 11 is a flow chart of the second preferred embodiment of the network authentication method illustrating how the identity of the user 5 is verified. The second preferred embodiment of the network authentication method includes the following steps.

In step S10, the user 5 inputs user login data using a user input interface (not shown) of the user terminal 1' at a website provided by the content-provider server 2. Then, the user terminal 1' transmits the user login data and the first positioning data to the content-provider server 2 via the communication network 100. In this embodiment, the user login data includes a user identification (ID) serving as a user identifier, and a password.

In step S11, upon receipt of the user login data and the first positioning data from the user terminal 1', the content-provider server 2 checks whether the user login data is correct. If the result is affirmative, the flow proceeds to step S12. Otherwise, the content-provider server 2 sends an error message to the user terminal 1' for displaying on a display device (not shown) of the user terminal 1' (step S9).

In step S12, the content-provider server 2 transmits a first request, which includes the user identifier, to the verification server 3 via the communication network 100. In this embodiment, the verification server 3 may be regarded as a third party appointed by the content-provider server 2 to perform hardware identification authentication.

In step S13, after receipt of the first request from the content-provider server 2, the verification server 3 further receives hardware identification data and positioning information that are associated with the portable personal communication device 4' from the portable personal communication device 4' via the communication network 100. In one example, in response to the first request from the content-provider server 2, the verification server 3 transmits a second request for the hardware identification data and the second positioning data to the portable personal communication device 4' via the communication network 100. Thus, in response to the second request from the verification server 3, the portable personal communication device 4' performs GPS positioning to generate the second positioning data that corresponds to a current geographical location of the portable personal communication device 4', executes the scan program 42' to obtain a combination of identification codes of certain ones of a plurality of hardware components (not shown) of the portable personal communication device 4' that serves as the hardware identification data, and transmits the second positioning data and the hardware identification data to the verification server 3 via the communication network 100. In another example, the portable personal communication device 4' is operable to perform GPS positioning so as to obtain the second positioning data in a periodic manner, to execute the scan program 42' to obtain the combination of the identification codes that serves as the hardware identification data automatically, and to transmit the second positioning data and the hardware identification data to the verification server via the communication network 100 in a periodic manner. Thus, the verification server 3 receives the hardware identification data and the second positioning data periodically.

In step S14, the verification server 3 determines whether the hardware identification data obtained thereby is a subset of reference hardware identification data 31, which is pre-stored in the verification server 3 and which corresponds to the user identifier. If the result of the determination is affirmative, the flow proceeds to step S15. Otherwise, the flow goes to step S18.

In step S15, the verification server 3 transmits the second positioning data to the content-provider server 2. It should be noted that, when the portable personal communication device 4' periodically transmits the hardware identification data and the second positioning data, the second positioning data, which is most recently received by the verification server 3 in step S13 after receipt of the first request from the content-provider server 2, is transmitted to the content-provider server 2.

In step S16, the content-provider server 2 determines, based on the first positioning data and the second positioning data, whether the user terminal 1' and the portable personal communication device 4' are in close proximity to each other. When the content-provider server 2 detects that the first positioning data is identical to the second positioning data, the content-provider server 2 determines that the user terminal 1' and the portable personal communication device 4' are in close proximity to each other. Then, the content-provider server 2 deems that the identity of the user 5 has been successfully authenticated (step S17). Thus, the user 5 is allowed data access to the content-provider server 2 using the user terminal 1'. Otherwise, the flow goes to step S19.

In step S18, when the hardware identification data is not found to be a subset of the reference hardware identification data 31, the verification server 3 transmits a failed verification reply to the content-provider server 2.

In step S19, in response to the failed verification reply from the verification server 3 in step S18, or when the user terminal 1' is determined as not in close proximity to the portable personal communication device 4' in step S16, the content-provider server 2 deems that authentication of the identity of the user 5 has failed. Thus, the user 5 is denied data access to the content-provider server 2.

In sum, the network authentication method of this invention utilizes hardware identification verification and positioning verification for the user terminal 1, 1' and the portable personal electronic device 4, 4'. Accordingly, it is relatively difficult for hackers to simultaneously steal hardware and positioning information associated with the user terminal 1, 1' and the portable personal electronic device 4, 4', thereby ensuring secure verification of the identity of the user 5. Further, the user's own smart phone or tablet computer is used as the portable personal electronic device 4, 4' without requiring additional identity verification devices. Therefore, the cost of identity authentication for the content-provider server 2 is minimized.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A network authentication method to be implemented by a network authentication system for secure verification of the identity of a user, the network authentication system including a user terminal operated by the user, a content-provider server, a verification server, and a portable personal electronic device carried by the user, the user terminal, the content-provider server and the verification server being connected to a communication network, the portable personal electronic device being capable of connection with the communication network and/or short-distance wireless communication with the user terminal, said network authentication method comprising the steps of:
    a) upon receipt of correct user login data, which includes a user identifier, from the user terminal via the communication network, the content-provider server transmitting a verification request, which includes the user identifier, to the verification server via the communication network;
    b) after receipt of the verification request from the content-provider server, the verification server further receiving hardware identification data and positioning information that are associated with the user terminal and the portable personal electronic device via the communication network, wherein the hardware identification data cooperatively constitutes a first combination of identification codes and a second combination of identification codes;
    c) in response to the verification request, the verification server determining whether the hardware identification data obtained in step b) matches or is a subset of reference hardware identification data, which is pre-stored in the verification server and which corresponds to the user identifier, and judging, based on the positioning information, whether the user terminal and the portable personal electronic device are in close proximity to each other; and
    d) upon detecting that a match exists or that the hardware identification data is a subset of the reference hardware identification data and judging that the user terminal and the portable personal electronic device are in close proximity to each other, the verification server transmitting a verification reply indicating successful authentication of the identity of the user to the content-provider server via the communication network.

2. The network authentication method as claimed in claim 1, the portable personal electronic device being connected to the communication network, two different network addresses being assigned respectively to the user terminal and the portable personal electronic device, the network authentication method further comprising, between steps a) and b), the steps of:
  e) the content-provider server transmitting a first data request to the user terminal via the communication network;
  f) in response to the first data request from the content-provider server, the user terminal performing global positioning system (GPS) positioning so as to obtain first positioning data corresponding to a geographical location of the user terminal, executing a first scan program pre-installed therein to obtain the first combination of identification codes of certain ones of a plurality of hardware components of the user terminal, and transmitting the first positioning data and the first combination of the identification codes to the verification server via the communication network; and
  g) the portable personal electronic device performing GPS positioning so as to obtain second positioning data corresponding to a current geographical location of the portable personal electronic device, executing a second scan program pre-installed therein to obtain the second combination of identification codes of certain ones of a plurality of hardware components of the portable personal electronic device, and transmitting the second positioning data and the second combination of the identification codes to the verification server via the communication network; and
  wherein the first combination of the identification codes transmitted in step f) and the second combination of the identification codes transmitted in step g) cooperatively constitute the hardware identification data received by the verification server in step b), and the first positioning data transmitted in step f) and the second positioning data transmitted in step g) cooperatively constitute the positioning information received by the verification server in step b).

3. The network authentication method as claimed in claim 2, wherein:
  in step e), the content-provider server further transmits a second data request to the portable personal electronic device via the communication network; and
  in step g), the portable personal electronic device performs GPS positioning and executes the second scan program in response to receipt of the second data request from the content-provider server.

4. The network authentication method as claimed in claim 2, further comprising, prior to step g), the step of:
  f') in response to receipt of the verification request from the content-provider server, the verification server transmitting a second data request to the portable personal electronic device via the communication network; and
  wherein in step g), the portable personal electronic device performs GPS positioning and executes the second scan program in response to receipt of the second data request from the verification server.

5. The network authentication method as claimed in claim 2, wherein:
  in step g), the portable personal electronic device performs GPS positioning so as to obtain the second positioning data in a periodic manner, automatically executes the second scan program to obtain the second combination of the identification codes, and transmits the second positioning data and the second combination of the identification codes to the verification server in a periodic manner; and the first combination of the identification codes transmitted in step f), and the second combination of the identification codes, which is most recently transmitted to the verification server in step g) after the verification server has received the verification request, cooperatively constitute the hardware identification data, and the first positioning data transmitted in step f), and the second positioning data, which is most recently transmitted to the verification server in step g) after the verification server has received the verification request, cooperatively constitute the positioning information.

6. The network authentication method as claimed in claim 2, wherein, in step c), the verification server determines that the user terminal and the portable personal electronic device are in close proximity to each other when the first positioning data is identical to the second position data.

7. The network authentication method as claimed in claim 1, the portable personal electronic device being capable of short-distance wireless communication with the user terminal, the network authentication method further comprising, between steps a) and b), the steps of:
  h) the content-provider server transmitting a first data request to the user terminal via the communication network;
  i) in response to the first data request from the content-provider server, the user terminal executing a first scan program pre-installed therein to obtain a first combination of identification codes of certain ones of a plurality of hardware components of the user terminal, and, upon establishing a short-distance wireless communication link with the portable personal electronic device, transmitting a second data request to the portable personal electronic device through the short-distance wireless communication link;
  j) in response to the second data request from the user terminal, the portable personal electronic device transmitting identification data associated therewith to the user terminal through the short-distance wireless communication link; and
  k) the user terminal transmitting the hardware identification data, which consists of the first combination of the identification codes and the identification data, and the positioning information to the verification server via the communication network.

8. The network authentication method as claimed in claim 7, wherein, in step j), the portable personal electronic device executes a second scan program pre-installed therein to obtain a second combination of identification codes of certain ones of a plurality of hardware components of the portable personal electronic device, the second combination of the identification codes serving as the identification data.

9. The network authentication method as claimed in claim 8, wherein, in step c), the verification server determines that the user terminal and the portable personal electronic device are in close proximity to each other when the positioning information indicates that the user terminal and the portable personal electronic device share the same network address.

10. The network authentication method as claimed in claim 7, the portable personal electronic device being an electronic card, wherein:
  in step j), the identification data is an identification code, which is pre-stored in and which corresponds uniquely to the electronic card; and
  in step k), the positioning information indicates that the user terminal and the portable personal electronic device are in close proximity to each other.

11. A network authentication method to be implemented by a network authentication system for secure verification of the identity of a user, the network authentication system including a user terminal operated by the user, a content-provider server, a verification server, and a portable personal communication device carried by the user, the user terminal, the content-provider server, the verification server and the portable personal communication device being connected to a communication network, said network authentication method comprising the steps of:
   a) upon receipt of correct user login data including a user identifier, and of first positioning data corresponding to a geographical location of the user terminal from the user terminal via the communication network, the content-provider server transmitting to the verification server a first request, which includes the user identifier, for second positioning data corresponding to a current geographical location of the portable personal communication device via the communication network;
   b) upon receipt of the first request from the content-provider server, the verification server further receiving hardware identification data and second positioning data that are associated with the portable personal communication device from the portable personal communication device via the communication network, the hardware identification data including a combination of identification codes of a plurality of hardware components of the portable personal communication device and a plurality of hardware components of the user terminal;
   c) the verification server determining whether the hardware identification data obtained in step b) matches or is a subset of reference hardware identification data, which is pre-stored in the verification server and which corresponds to the user identifier, and transmitting the second positioning data to the content-provider server if a match exists or if the hardware identification data is a subset of the reference hardware identification data; and
   d) upon receipt of the second positioning data from the verification server, the content-provider server judging, based on the first positioning data received thereby in step a) and the second positioning data transmitted thereto in step c), whether the user terminal and the portable personal communication device are in close proximity to each other, and judging a successful authentication of the identity of the user upon judging that the user terminal and the portable personal communication device are in close proximity to each other.

12. The network authentication method as claimed in claim 11, further comprising, between steps a) and b), the steps of:
   e) in response to the first request from the content-provider server, the verification server transmitting a second request for the hardware identification data and the second positioning data to the portable personal communication device via the communication network; and
   f) in response to the second request from the verification server, the portable personal communication device performing GPS positioning so as to generate the second positioning data that corresponds to a current geographical location of the portable personal communication device, executing a scan program pre-installed therein to obtain the combination of identification codes of the plurality of hardware components of the portable personal communication device that serves as the hardware identification data, and transmitting the second positioning data and the hardware identification data to the verification server via the communication network.

13. The network authentication method as claimed in claim 11, further comprising the step of:
   g), the portable personal communication device performing GPS positioning so as to generate the second positioning data in a periodic manner and executing a scan program pre-installed therein to obtain a combination of identification codes of a plurality of hardware components of the portable personal communication device that serves as the hardware identification data automatically, and transmitting the second positioning data and the hardware identification data to the verification server via the communication network in a periodic manner; and
   wherein in step c), the second positioning data, which is mostly recently received by the verification server in step b) after receipt of the first request from the content-provider server, is transmitted to the content-provider server.

14. The network authentication method as claimed in claim 11, wherein, in step d), the content-provider server judges that the user terminal and the portable personal communication device are in close proximity to each other when the first positioning data is identical to the second positioning data.

* * * * *